(No Model.)
2 Sheets—Sheet 1.

C. W. SALADEE.
CYCLE VEHICLE.

No. 486,056. Patented Nov. 8, 1892.

Witnesses:
J. B. McGirr.
H. F. Bernhard

Inventor:
Cyrus W. Saladee
By his Attorneys,
Edson Bros.

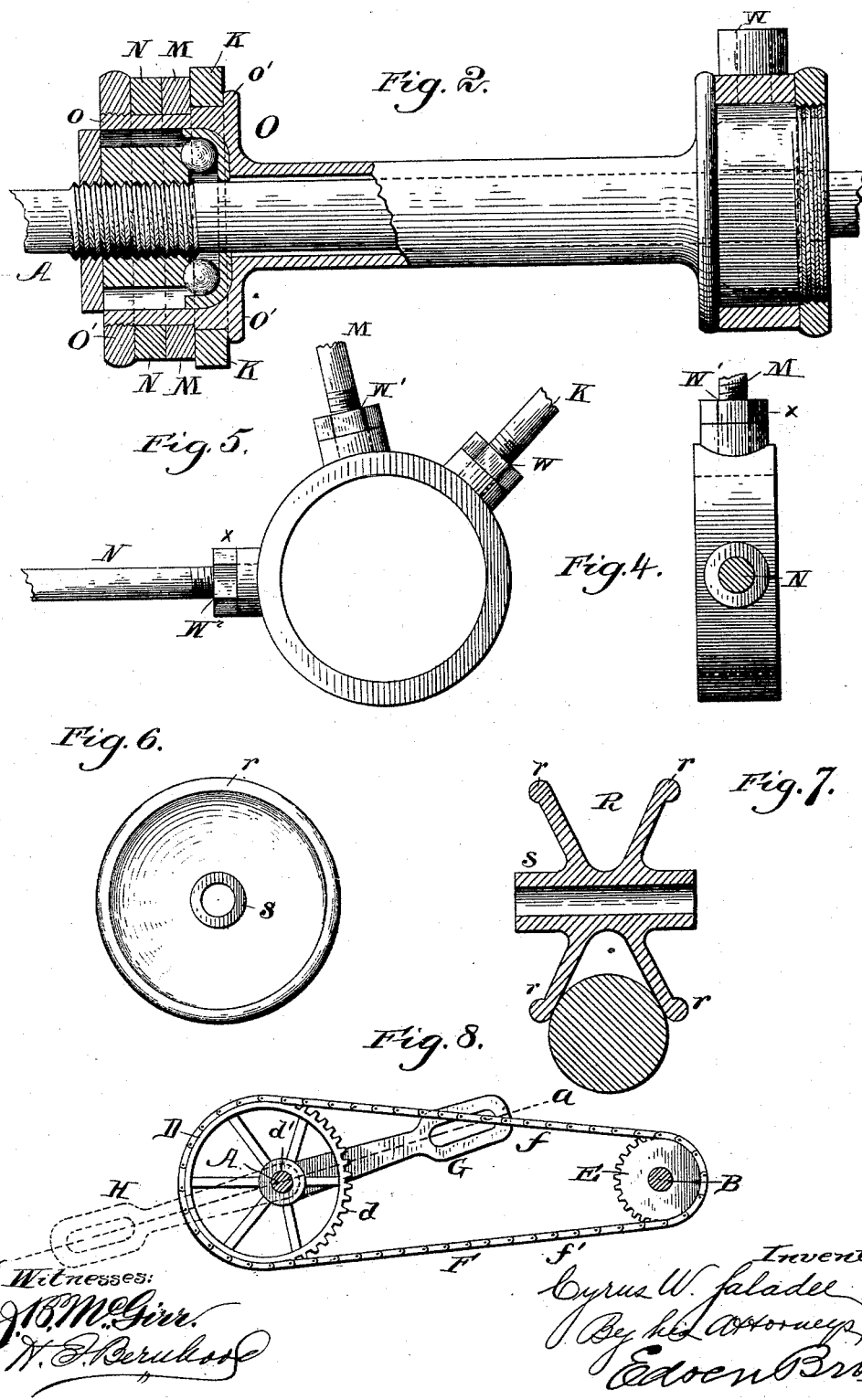

UNITED STATES PATENT OFFICE.

CYRUS W. SALADEE, OF CLEVELAND, OHIO, ASSIGNOR TO WILLIAM N. WOODRUFF, OF HARTFORD, CONNECTICUT.

CYCLE-VEHICLE.

SPECIFICATION forming part of Letters Patent No. 486,056, dated November 8, 1892.

Application filed March 14, 1892. Serial No. 424,864. (No model.)

*To all whom it may concern:*

Be it known that I, CYRUS W. SALADEE, a citizen of the United States, residing at Cleveland, in the county of Cuyahoga and State of Ohio, have invented certain new and useful Improvements in Cycle-Vehicles; and I do hereby declare the following to be a full, clear, and exact description of the invention, such as will enable others skilled in the art to which it appertains to make and use the same.

My invention relates to improvements in cycle-vehicles of that class commonly known as "safety-bicycles," adapted to be propelled by sprocket-and-chain gearing between a pedal or crank shaft and the rear axle of the machine; and the invention consists, first, of a novel form of propelling mechanism in which the power or master wheel has a cam or eccentric motion around the pedal-shaft to attain increased speed and power by the efforts applied by the rider to the pedal-cranks; secondly, in a detachably connected and suspended bearing or hub adapted to carry the driving pedal-shaft of the machine on which the cranks and pedals are mounted; third, an improved connection between the frame and said driving-shaft bearing or hub; fourth, a novel construction of the general or main frame of the machine, whereby it can be converted into either a rigid frame or a spring-frame; fifth, an improved adjusting device for taking up the slack in the sprocket-chain between the driving-shaft and the rear driven axle of the machine; sixth, an improved form of spring-fork having means for increasing its rigidity or stiffness; seventh, improved means for sustaining the fender over the rear wheel of the machine; eighth, a novel form of brake mechanism, which operates to effectually retard the motion of the machine without stopping the same too suddenly and "locking" the wheel, and thus obviate undue strain on the machine and the liability of damage to the elastic tire on the wheel.

The invention is fully illustrated in the accompanying drawings, forming a part of this specification, and in which—

Figure 1:
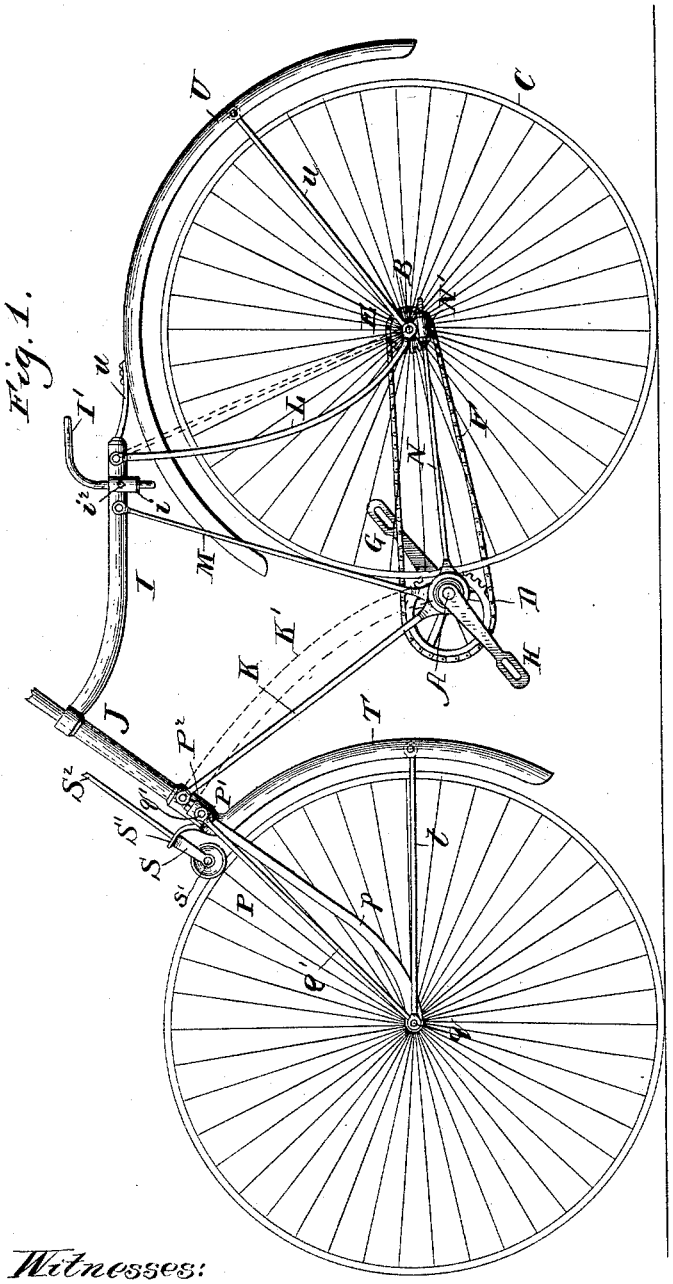
Figure 3:
Figure 9:
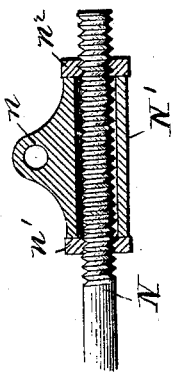

Figure 1 is a side elevation of a cycle-vehicle embodying my present invention, the dotted lines therein indicating a modified form of frame, which may be used to impart rigidity and stiffness to the machine. Fig. 2 is an enlarged detail view, partly in side elevation and partly in section, of the hub or bearing for the driving-shaft and illustrating two devices or constructions by which the bars or members of the main frame may be connected to said bearing or hub. Fig. 3 is a detail view in elevation of a part of one of the bars or members of the main frame. Figs. 4 and 5 are side and end views of a collar or sleeve for fastening the meeting ends of the frame bars or members to the bearing or hub, which views illustrate the device employed on the right-hand end of Fig. 2 to connect the frame-bars and bearing-sleeve. Fig. 6 is a face view of the roller brake-shoe on an enlarged scale. Fig. 7 is a sectional view through the brake-shoe and tire of the front wheel, showing the method of applying the shoe to said tire. Fig. 8 is a diagrammatic view illustrating the improved form of propelling mechanism employed to transmit the power of the driving-shaft to the rear axle of the machine.

Like letters of reference denote corresponding parts in the several figures of the two sheets of drawings.

In this invention I aim to provide a novel form of propelling mechanism, in which the application of power on the master driving-gear carried by the pedal-shaft is retained for such a proportion of the revolution of said wheel and the power is so nearly equalized that the dead-center of the master-gear is nearly or quite overcome, the master-gear being thus subject to the application of power for a greater percentage of each revolution than the form of sprocket-wheel heretofore commonly used in sprocket-and-chain propelling mechanisms. The master-gear is so supported and the pedal-cranks are so arranged and connected to the driving-shaft relatively to said master-gear that the pulling-point at the initial application of power is at a point on the eccentric master-gear, which aids the crank leverage, and as the foot and pedal moves downward to apply the power and the full power of the rider is available for use the highest point or greatest radius of the eccentric master-gear is reached and the highest speed is attained, and as the pedal reaches a point where the rider cannot apply the full power to the pedal the sprocket-chain is drawn toward that portion of the master-gear having the least radius, and the momentum of the machine carries the master-gear past the dead-center, thereby increasing the power exerted through the cranks and sprocket-chain upon the rear driving-wheel. Thus from the action of the cranks connected to the pedal or driving shaft in the lines of the longer and shorter radii of the master-gear power and speed is attained, while the power applied to the cranks is so nearly equalized that the dead-center is practically overcome.

A wheel equipped with my improved form of propelling mechanism enables the rider to climb grades with much less effort and a higher average rate of speed can be secured, as the leverage is proportioned at every point of revolution of the master-gear to the available power of the rider.

In the drawings, A designates the driving or pedal shaft.

B is the axle of the rear wheel; C D, the master gear or sprocket on the pedal-shaft; E, the driven gear or sprocket rigid with one end of the rear axle B, and F is the sprocket-chain connecting the two gears or wheels D E.

The master gear or sprocket D is made with a continuous circular rim or periphery $d$ and a hub or center $d'$, which is placed within the rim or periphery eccentric to the same, said rim and eccentric hub being joined by radial spokes or a web in the usual or any preferred manner. The outer surface or edge of the circular rim is provided with sprocket-teeth of the usual or any preferred form, and through the eccentric hub $d'$ of said gear or sprocket is formed an opening or passage, in which is fitted the driving or pedal shaft A of the cycle-vehicle, the shaft and sprocket or gear D being rigidly fastened together and and the gear or sprocket being eccentric to the shaft. Said sprocket is secured to the shaft at its end or at a point thereon, so as to be in line with the driven sprocket E on the rear axle, to enable the chain F to properly pass around and engage with the teeth on said sprocket-wheels.

The dotted line $a$ in Fig. 8 indicates one of the shorter radii of the master gear or sprocket D, and the dotted line $b$ indicates one of the longer radii of said master sprocket or gear, said lines $a$ $b$ being in line with each other, as indicated, such arrangement being specified here for a purpose which I will now explain.

G designates one of the pedal-cranks, and H is the companion pedal-crank, which are located at diametric points relative to the shaft and its master gear or sprocket, and the crank G is secured to the pedal-shaft in the line of its shorter radius $a$, while the other crank H is in the line of the longer radius $b$ of the master-gear.

The two pedal-cranks are secured to opposite ends of the shaft A in any preferred way, and as the power is applied to the pedals and the cranks and shaft thereby rotated the upper side $f$ of the chain is drawn closer to the shaft when the shorter radius $a$ of the gear or sprocket is uppermost, thus slackening the tension on the lower side $f'$ of the chain, while the upper side of the chain is taut, and when the longer radius $b$ of the gear or sprocket is in front of the center and on approximately a horizontal line the upper and lower sides of the chain will be taut, so that the tension is taut and nearly uniform on the upper part of the chain at all points in the revolution of the master gear or sprocket.

I will now proceed to describe in detail the construction of the several parts of my improved cycle-vehicle.

The main frame of the machine consists of the horizontal backbone I, the steering-head J, the diagonal front bar or member K, the rear bar or member L, the vertical bar or member M, located between the front and rear bars K L, and the horizontal bar N, which are arranged and connected in the following manner:

It will be understood that on each side of the wheels of the machine I employ the arrangement of bars or members K, L, M, and N, but for the sake of clearness I will only describe the frame bars or members on one side of the machine, the same being shown in the principal Fig. 1 of the drawings, and the connection of the bars K, M, and N to one end of the driving-shaft hub being shown in the left-hand end of Fig. 2.

The front end of the tubular backbone I is solidly and rigidly fastened or secured to the upper end of the inclined steering-head J, and the rear end of this backbone is provided with a vertical or depending socket $i$, in which is fitted the vertical arm of an L-shaped saddle-post I', said post and backbone being rigidly and adjustably clamped together by a set-screw $i^2$ or equivalent fastening.

The hub or bearing O for the driving pedal-shaft is, as usual, located nearly in the vertical line of the saddle and just in advance of the rear wheel B of the machine, and the lower ends of the bars or members K and M and the front end of the bar N are connected or fastened to a rigid sleeve $o$ at one end of the bearing O, said bars K M N each having an eye or opening, as indicated in Fig. 3, to adapt the sleeve $o$ to enter the eyes, said meeting ends of the bars being fitted one against the other and being clamped in place between a rigid flange $o'$ on the bearing O and an adjustable threaded collar or nut O', which is screwed on the outer threaded end of the sleeve $o$ of the bearing, all as clearly shown in the left-hand end of Fig. 2.

The front bar K of the machine-frame extends from the hub or bearing O in an inclined direction to the lower end of the steering-head J, the upper end thereof being rigidly fastened to said head J by a bolt or in any equivalent way. The horizontal bar N of the frame extends rearwardly from the hub or bearing O, and the rear end thereof is externally screw-threaded and fitted loosely in the tension-adjusting sleeve N', which has a web or flange $n$ pivotally or loosely connected to the outer extremity of the rear axle B. This tension-sleeve N' is adapted to move a limited distance around the rear axle to compensate for the change of angle or position of the bar N when the chain is tightened, and in the threaded end of said bar N are fitted the two nuts $n'$ $n^2$, which bear against opposite ends of the pivoted sleeve N', so that the rear axle and hub or bearing O can be moved from each other to take up any slack in the chain. The bars M L are arranged in vertically-inclined positions, the degree of inclination of the rear bar L being greater than that of the upright middle bar M, and the upper ends of these two bars L M are fastened to the backbone I on opposite sides of the socket for the saddle-post, as indicated.

The rear bar L of the main frame is connected or fastened at its lower end to the end of the rear axle, or it may be fastened in any other suitable way, and when a frame having a limited extent of yielding motion or resiliency is desired this rear bar L is curved longitudinally and bowed inwardly toward the bearing of the pedal or crank shaft, so that when the weight of the rider is imposed upon the saddle and backbone this bar L will become a flexion-spring and give or yield to a limited extent. If, however, the frame is a rigid one, the rear upright bar is made of a straight piece of metal and fitted in a right line between the rear axle and the backbone, as indicated by dotted lines in Fig. 1.

In lieu of the two inclined front bars K of the main frame I may employ a single stout bar, as indicated by dotted lines at K', said bar being rigidly fastened at one end to the steering-head and at its other end to the middle of the hub or bearing O of the pedal-shaft, as is obvious.

P is the yielding steering-fork, which consists of the curved flexion-rods $p$, only one of which is shown in Fig. 1, and these rods sustain the bearings for the axle $q$ of the front wheel. The upper ends of the rods $p$ are joined to a cross-head P', which bears against the lower end of the steering-head J, and to the cross-head is rigidly secured the steering-stem P², which extends loosely through the steering-head J and has its upper end connected to the usual handle-bar. (Not shown.) To increase the stiffness or rigidity of the steering-fork, I employ the rods Q', one of which is shown in Fig. 1, the lower end of which is pivoted on the front axle and the upper end thereof connected by a bolt $q'$ to the cross-head P' at the point where the flexion-rod $p$ branches out from the head.

I employ a novel form of brake mechanism, which operates to retard the motion of the front wheel without locking or too suddenly arresting the motion thereof, thus preventing rupture or undue chafing of the elastic tire with which the wheel is equipped, as well as undue strain on the machine-frame and relieving the jar or shock on the rider. The brake-shoe R is in the form of a roller or wheel having its tread formed of two inclined annular walls $r$ $r$, which provide a deep V-shaped groove in the roller or wheel to receive the elastic tire R' of the front wheel within the same to a considerable extent and enable the inclined walls $r$ $r$ to bear laterally in the tire, as shown in Fig. 7. This roller has a central elongated hub $s$, through which passes a shaft or pin $s'$, having its ends supported in a roller-bracket S, which is fitted and guided in a rigid arm S', suitably attached to the cross-head P' of the steering-fork, so as to turn therewith, and this roller-bracket and brake-roller are adapted to be depressed by means of an operating-stem S², which is attached to suitable operating means on the handle-bar, (not shown,) the normal position of the parts being such that the brake-roller is lifted out of contact with the elastic tire.

T is the fender of the front wheel, which, as usual, is attached at the upper end to the steering-fork and connected by rods $t$ at its lower end to the lower part of said fork.

U is the segmental fender over the rear wheel of the machine, and the upper front end of this fender is sustained directly by the longitudinal backbone I, this being effected by means of an arm $u$, which is rigidly fastened at its respective ends to the rear extremity of the backbone and to the fender. The lower rear part of the fender is suitably held by the rods $u'$ in the usual manner.

In lieu of forming the members of the main frame with eyes at their meeting ends and securing said ends in place on the hub by a common nut or collar, I may secure the inner end of each bar or member independently to the hub or bearing in the manner indicated in the right-hand end of Fig. 2 and in Figs. 4 and 5. To secure this independent fastening, I provide the outer surface of the hub or bearing at the end thereof with a series of radial sockets $w$ $w'$ $w^2$, which are screw-threaded internally and occupy such radial positions that the inner threaded ends of the bars K, L, and N can be screwed into the sockets, a jam-nut $x$ being adjusted on each bar against the end of the socket to prevent the parts from working loose. The radial threaded sockets may be made integral with a detachable collar W, which is slipped over the sleeve on the end of the hub or bearing and confined in place between the flange $o$ and the nut O', or the sockets may be rigid or integral with the outer part of the hub or bearing. The bearing has the usual cone-sleeves and antifriction balls or rollers.

The operation and advantages of my invention will be readily understood by those skilled in the art from the foregoing description, taken in connection with the drawings.

It is evident that modifications in the form and proportion of parts and details of construction of the mechanism herein shown and described as an embodiment of my invention can be made without departing from the spirit or sacrificing the advantages thereof, and I reserve the right to make such alterations as fairly fall within the scope of the invention.

What I claim as new, and desire to secure by Letters Patent, is—

1. In a cycle-vehicle, a propelling mechanism embracing a pedal or crank shaft, a master driving-gear provided with a circular toothed periphery and an eccentric hub, in which the crank-shaft is rigidly secured, a driven gear or wheel, and suitable connections between the master and driven wheels, as and for the purpose set forth.

2. In a cycle-vehicle, the propelling mechanism comprising the pedal or crank shaft, the master-sprocket provided with a circular toothed periphery, and the rigid hub arranged eccentrically within said circular periphery, a driven sprocket-wheel, a suitable chain between said wheels, and the pedal-cranks secured to the shaft in the lines of the shorter and longer radii from the eccentric hub of the master sprocket-wheel, as and for the purpose described.

3. In a cycle-vehicle, a propelling mechanism comprising a pedal or crank shaft, the master sprocket-wheel having a circular toothed periphery eccentric to the shaft, two pedal-cranks arranged on the shaft at diametrically-opposite points thereto and respectively in the lines of the longer and shorter radii from the eccentric hub to the periphery of the master-sprocket, a driven wheel, and a connecting-chain, as and for the purpose described.

4. In a cycle-vehicle, the combination, with a steering-head and the rear axle, of a single longitudinal backbone united to the steering-head, a single transverse bearing for the pedal-shaft, a series of diverging bars forming a part of the frame and all united rigidly to the bearing at their meeting ends and having their outer ends secured to the steering-head, the backbone, and the rear axle, respectively, and the flexion-brace between the rear axle and the rear extremity of the backbone, as and for the purpose described.

5. In a cycle-vehicle, the combination, with a steering-head and a rear axle, of a backbone and the transverse bearing for the pedal-shaft and having its ends constructed to receive the meeting ends of the diverging braces which connect the bearing to the steering-head, the backbone, and the rear axle, said braces being rigidly confined in place by clamping-nuts, as and for the purpose described.

6. In a cycle-vehicle, the combination, with a steering-head and a rear axle, of the transverse bearing for the pedal-shaft and having its ends adapted to receive the braces, the longitudinal backbone, the diverging braces provided with eyes which receive the ends of the bearing and the nuts screwed on the ends of the bearing and adapted to confine the braces between annular flanges on the bearing and said nuts, as and for the purpose described.

7. In a cycle-vehicle, the combination, with a longitudinal backbone, a bearing, a rear axle, and braces connecting said parts, of the flexion-brace L, connecting the rear axle and the rear extremity of the backbone, said brace being deflected or curved inwardly toward the bearing and lying inside of a straight line between the rear axle and the backbone, as and for the purpose described.

8. In a cycle-vehicle, the brake mechanism having the roller-shoe made of a single piece of metal and provided with the continuous inclined walls adapted to bear laterally against the sides of a tire and suitable means for guiding and operating the support for said roller-shoe, as and for the purpose described.

9. In a cycle-vehicle, the brake mechanism comprising the slotted guide-arm rigid with the steering-fork, the roller-bracket fitted therein and having the operating-stem connected thereto, and the roller-shoe $s'$, journaled in the bracket, said shoe being formed in a single piece and provided with the deep V-shaped groove, forming continuous inclined side walls adapted to bear laterally against the sides of a tire, as and for the purpose described.

10. In a cycle-vehicle, the combination, with a rear axle and a longitudinal backbone, of the rear fender having its forward end extended below and beyond the rear end of said backbone and provided with the connecting-arm, which is rigidly fastened to said backbone, and the braces intermediate of the fender and the rear axle, as and for the purpose described.

11. The combination, with a rear axle and a hub or bearing for the pedal-shaft, of a sleeve loosely or pivotally connected to said axle and depending therefrom, a bar or rod fitted in the depending sleeve and connected to the hub or bearing, and the nuts fitted on the rod or bar and bearing against the ends of the sleeve, as and for the purpose described.

In testimony whereof I affix my signature in presence of two witnesses.

CYRUS W. SALADEE.

Witnesses:
LEONARD STOSKOPF,
MICHAEL STOSKOPF.